March 11, 1941.   C. W. AVERY ET AL   2,234,221
VEHICLE BODY
Filed Aug. 1, 1938   5 Sheets-Sheet 1
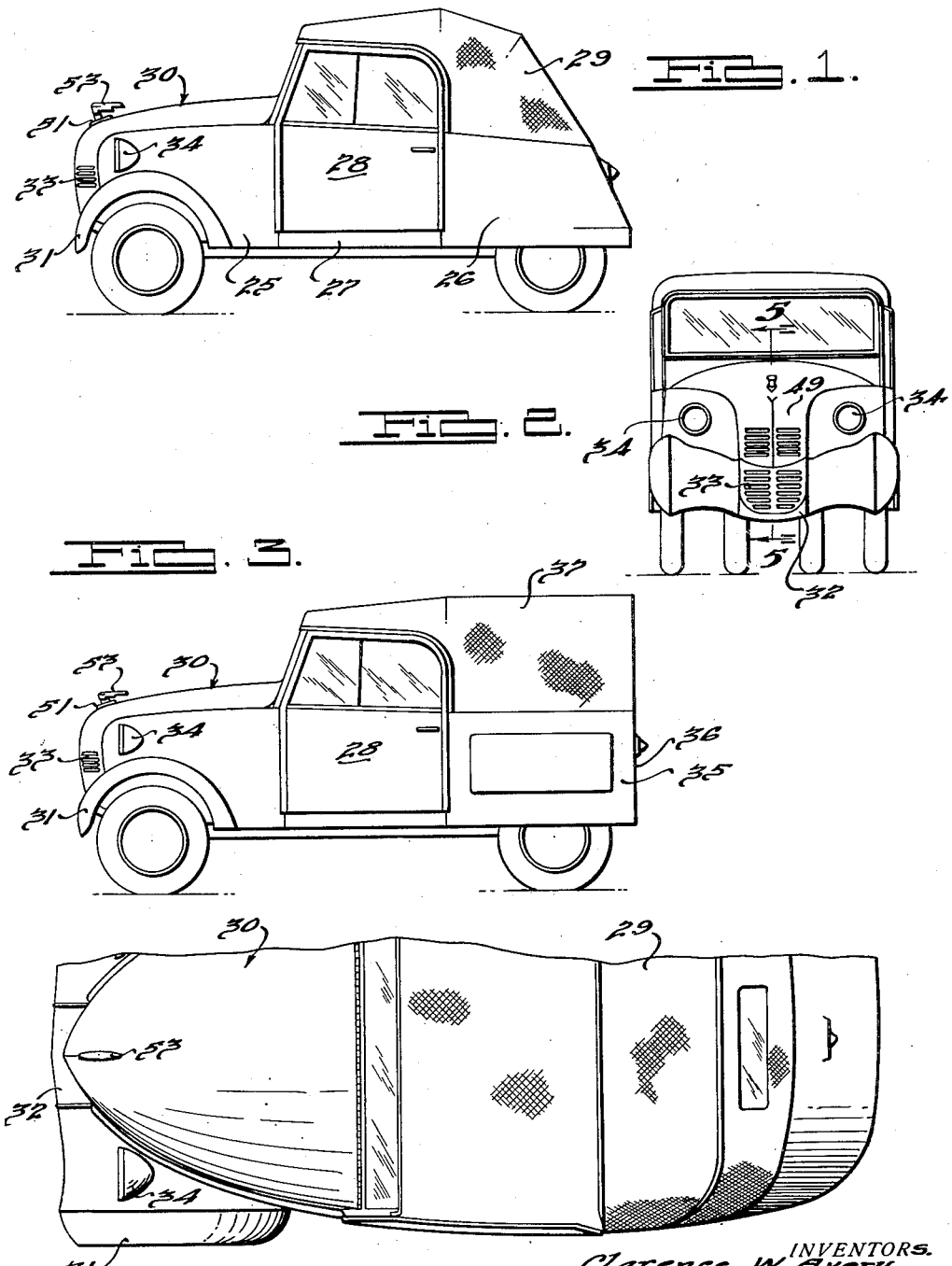
INVENTORS.
Clarence W. Avery,
Charles H. Widman,
Noble C. Clark.
BY Harness, Dickey & Pierce.
ATTORNEYS.

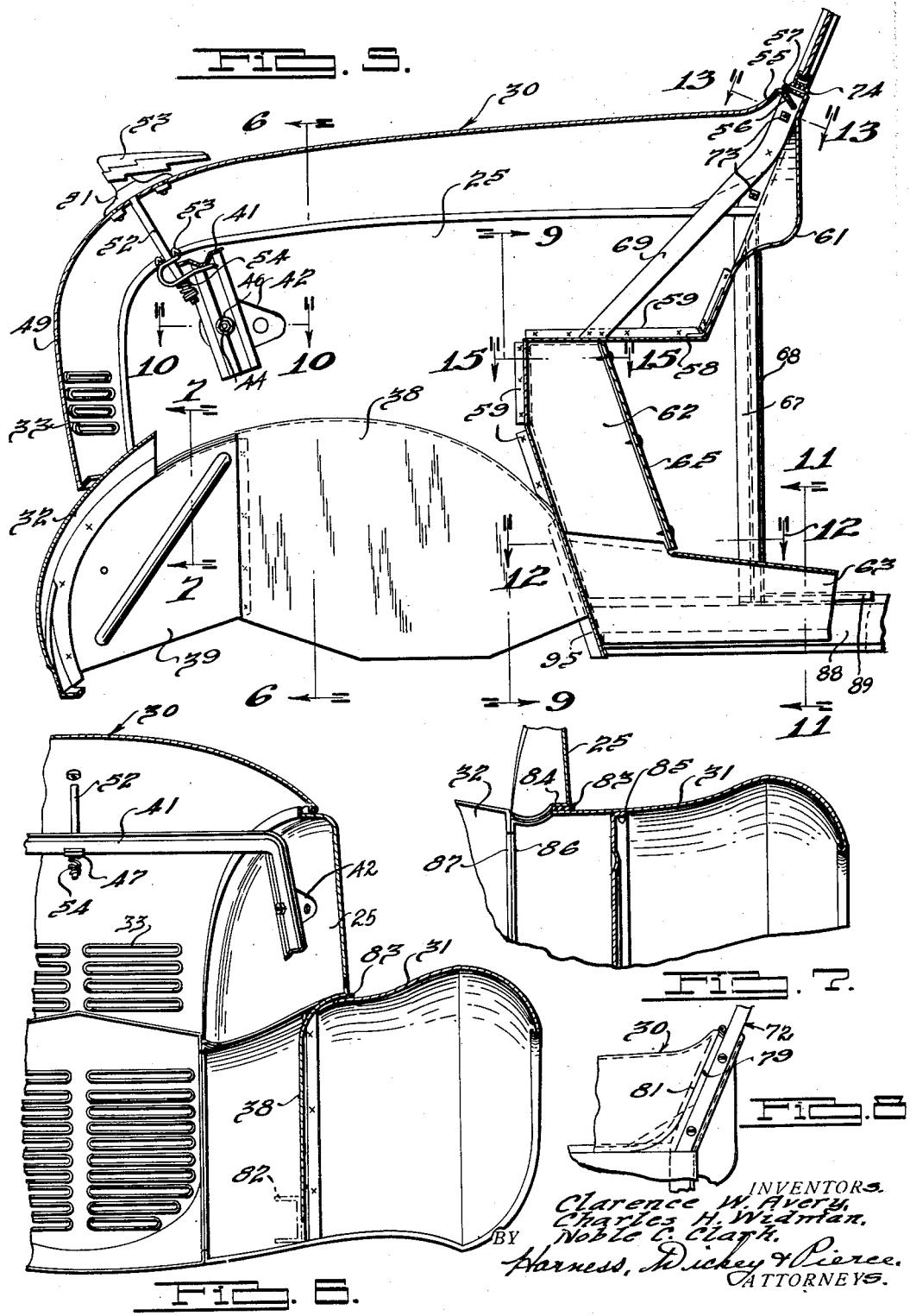

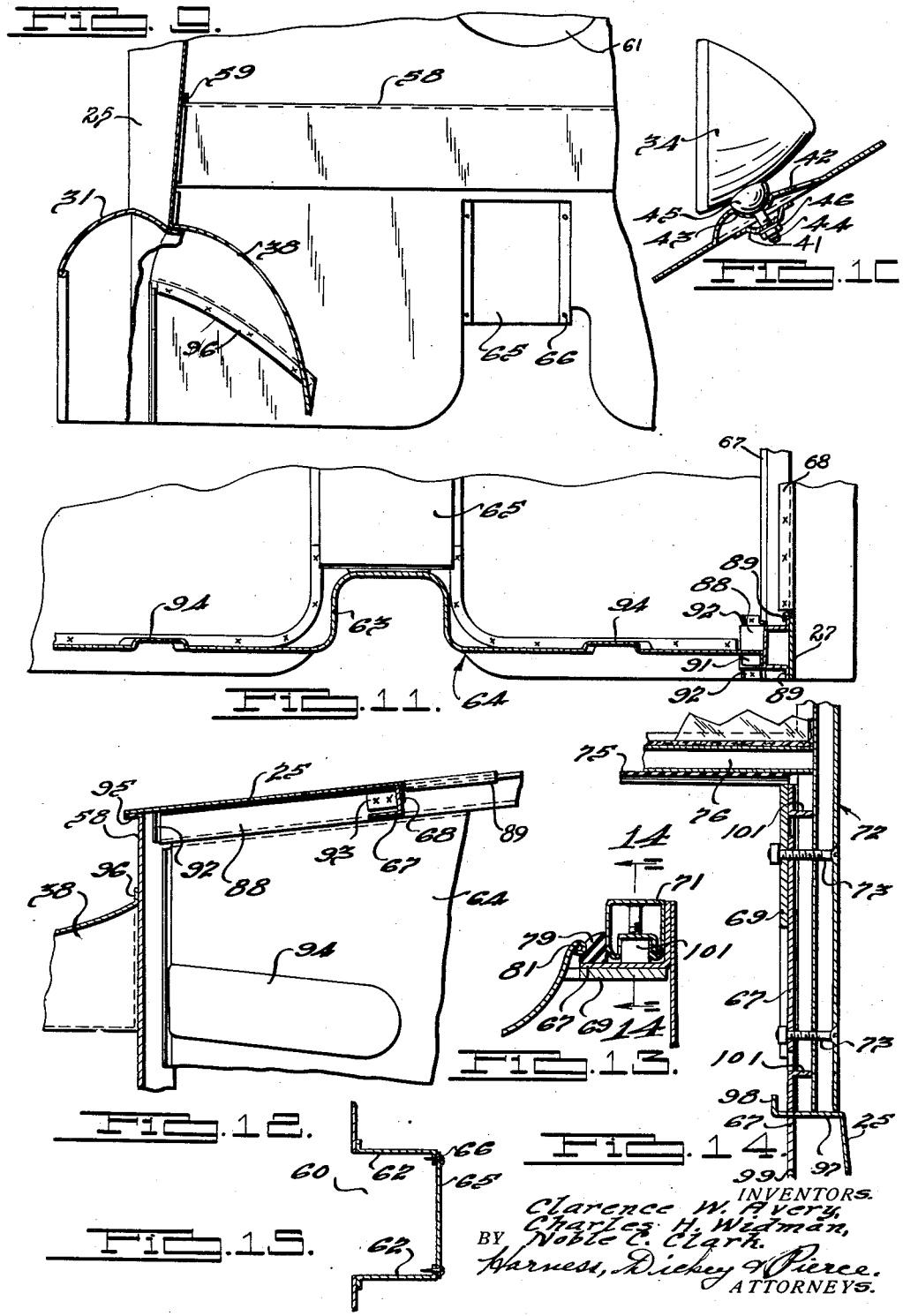

March 11, 1941.  C. W. AVERY ET AL  2,234,221
VEHICLE BODY
Filed Aug. 1, 1938  5 Sheets-Sheet 4
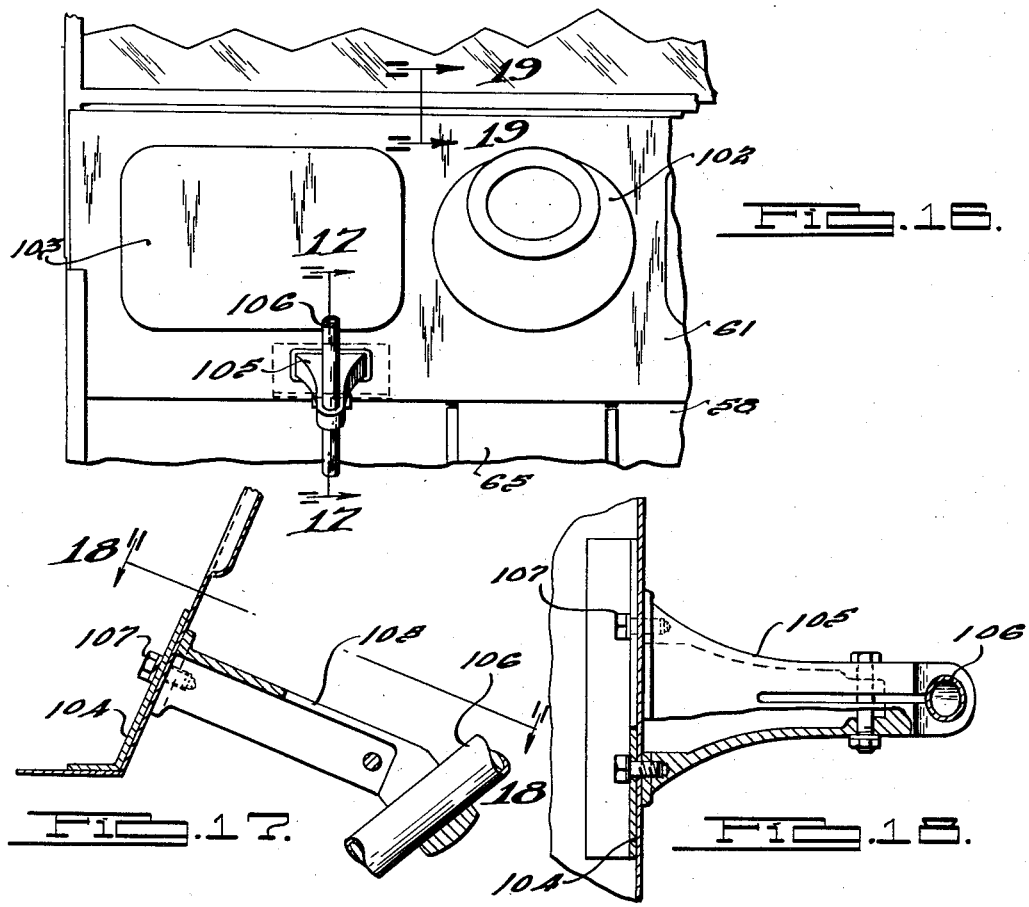
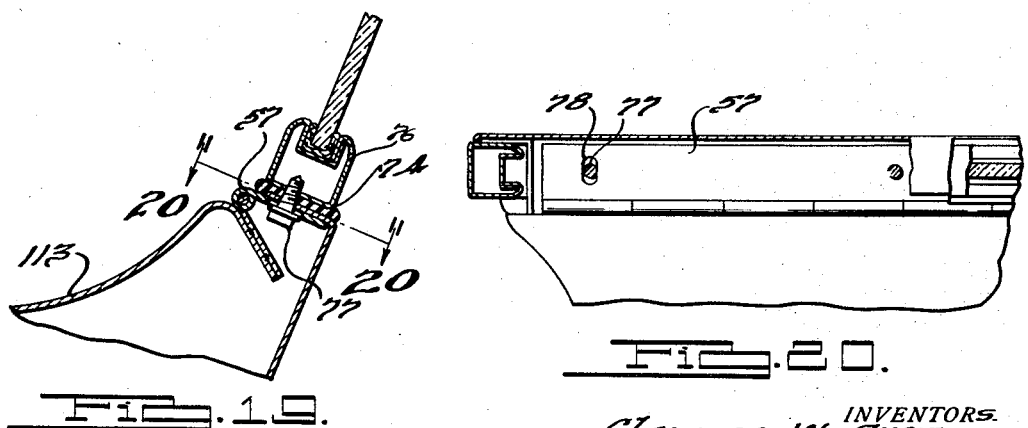
INVENTORS.
Clarence W. Avery,
Charles H. Widman,
BY Noble C. Clark.
Harness, Dickey & Pierce.
ATTORNEYS.

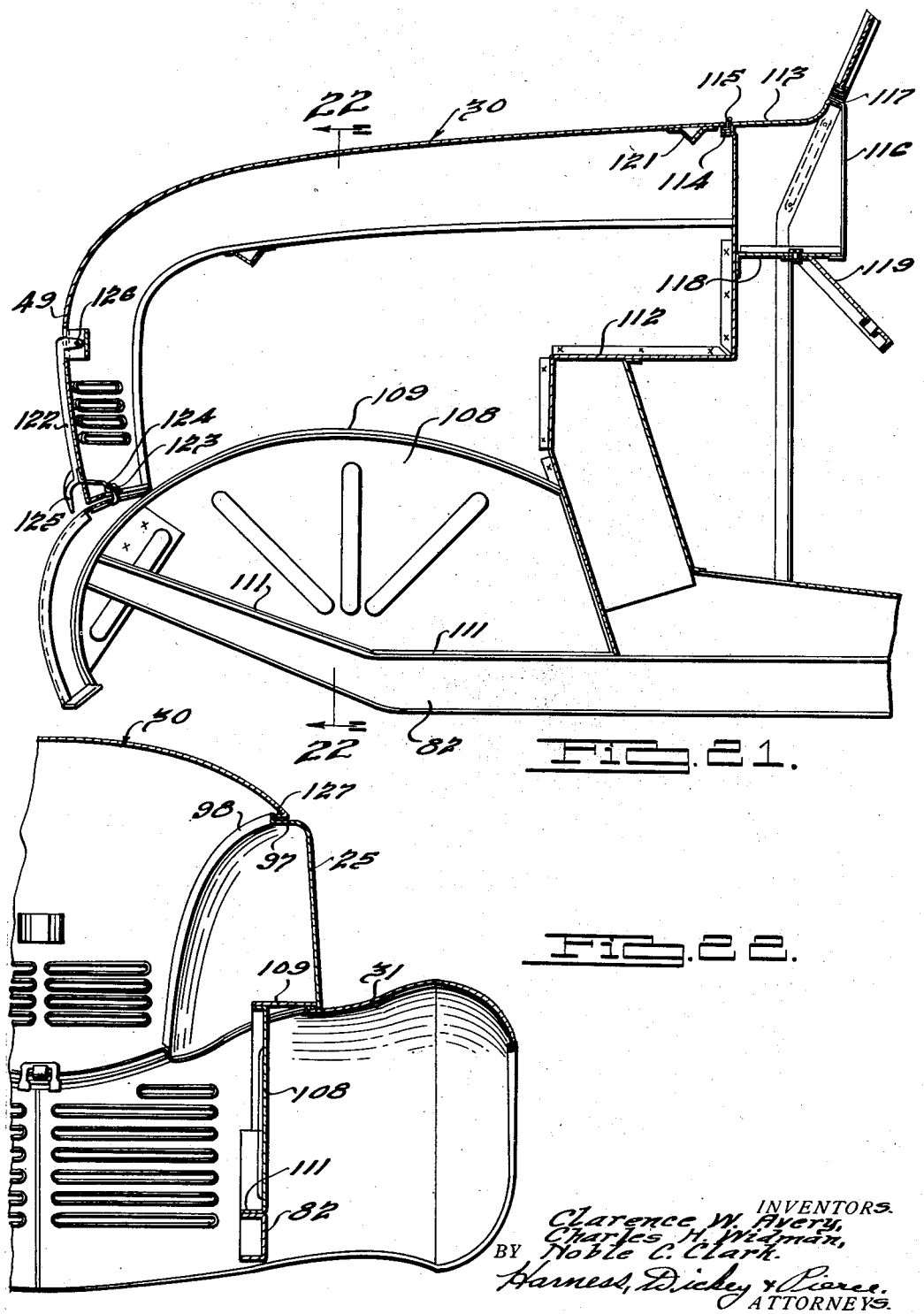

Patented Mar. 11, 1941

2,234,221

UNITED STATES PATENT OFFICE 2,234,221

VEHICLE BODY

Clarence W. Avery and Charles H. Widman, Detroit, and Noble C. Clark, Pleasant Ridge, Mich., assignors to The Murray Corporation of America, Detroit, Mich., a corporation of Delaware Application August 1, 1938, Serial No. 222,412

18 Claims. (Cl. 296—28)

This invention relates to vehicle bodies, and particularly to the novel arrangement of metal panels to form a body of a single thickness of material having reinforcing elements attached thereto to constitute a reinforced unit body construction.

It has been the practice heretofore in the art to form a plurality of sheet metal inner and outer panels into desired shape and by welding or other means secure them together along with reinforcing elements to form a double wall box section body. Various sections of the body were employed as dividing lines for the panels which have become fewer in number as the art of metal working and the metal have been advanced. However, in the prior constructions, an inner panel element cooperated with the outer finish panel at most of the points of the body to constitute a double wall structure.

In practicing this invention, a body is constructed from a reduced number of panels which are preformed into desired shape and welded or otherwise secured together and to reinforcing elements. The panel is so constructed and designed as to cooperate with the reinforcing elements to form a box or like structure at points requiring strength and reinforcement. Side cowl panels are formed to constitute the inner walls of the front wheel housing utilized as a support for the fenders which are attached thereto. A centrally disposed hood which bridges the side cowl panels is hinged directly to the windshield ledge which is preferably a unit portion of the instrument panel. The hood is latched to a cross brace interconnecting the front ends of the cowl side panels, the latch being supported on and operated by a medallion secured to the front end of the hood. The cross brace is novel in not only bracing the front end of the cowl side panels but also in constituting the support for the head lights which are attached directly to the panels.

The front ends of the cowl side panels are interconnected by an apron disposed in continuation with the front end of the hood having louvres therein through which air may pass into the engine compartment. An instrument or dash panel is formed of a unit stamping which interconnects the cowl side panels at the rear and which forms a ledge for the windshield and a support bar for the hinge of the hood. A brace interconnects the corners of the instrument panel to the cowl and dash panels and forms an anchoring means for the legs of the windshield frame which is bolted or otherwise secured thereto.

Centrally of the dash panel, a projecting forwardly presented channel element is provided to clear the engine and transmission which is mounted forwardly of the dash. The instrument panel is reinforced, on the engine compartment side thereof, by an angular plate which provides a support for a bracket which positions the steering wheel housing relative to the dash.

In a modified form of the invention, the instrument panel may be a separate element forming a box section structure with a top cowl panel and the dash panel, the point of connection of the dash panel with the cowl panel forming a support for the hinge for the hood. A latch may be provided on the front lower end of the hood for latching the lower end to the front apron which is disposed between the side cowl panels. In this construction, the cross bar above referred to may be eliminated, the bracing of the side cowl panels being effected by the instrument and top cowl panels.

Accordingly, the main objects of my invention are; to provide side cowl panels for a vehicle body which form the inner walls of the front wheel housings; to provide a dash panel for interconnecting the side cowl panels which is extended to form the instrument panel and the windshield ledge; to provide a hood for the side cowl panels which is hinged directly to the windshield ledge; to interconnect the front end of the side cowl panels with a bar to which the hood is latched; to provide an angular ledge on the top and front edge of the side cowl panels upon which the hinged hood may rest; to support the head lamps of the body in formed portions of the side cowl panels which are secured thereto when bolted to the front cross bar; to interconnect the front end of the side cowl panels with an apron which forms a support for the fenders and a lower bridging panel therebetween; to extend the legs of a windshield frame along the sides of the cowl panel and bolt or otherwise secure the ends thereto and to a reinforcing element; to support the bracket for the steering wheel on the instrument panel of the vehicle body and reinforce the supporting portion of the panel with an angle plate; and in general, to form the front end of a vehicle body from side cowl panels which are reinforced by a unit dash panel and by a cross bar, the former of which supports the bracket for the steering wheel, the latter of which forms attaching means for head lights and for the latch on the hood, all of which is simple in construction and economical of manufacture.

Other objects and features of novelty of this invention will be either specifically pointed out or will become apparent when referring, for a better understanding of the invention, to the following description taken in conjunction with the accompanying drawings, wherein:

Figure 1 is a side view in elevation of a vehicle provided with a body embodying features of the invention;

Fig. 2 is a front view of the structure illustrated in Fig. 1;

Fig. 3 is a side view of an automobile, similar to that of Fig. 1, having a body of the commercial type thereon;

Fig. 4 is an enlarged broken top view of the structure illustrated in Fig. 1;

Fig. 5 is an enlarged sectional view of the structure illustrated in Fig. 2, taken on the line 5—5 thereof;

Fig. 6 is a sectional view of the structure illustrated in Fig. 5, taken on the line 6—6 thereof;

Fig. 7 is a broken sectional view of the structure illustrated in Fig. 5, taken on the line 7—7 thereof;

Fig. 8 is an enlarged broken view of the structure illustrated in Fig. 1, taken at the junction between the hood, windshield, instrument panel, and a side cowl panel;

Fig. 9 is a sectional view of the structure illustrated in Fig. 5, taken on the line 9—9 thereof;

Fig. 10 is a sectional view of the structure illustrated in Fig. 5, taken on the line 10—10 thereof;

Fig. 11 is a sectional view of the structure illustrated in Fig. 5, taken on the line 11—11 thereof;

Fig. 12 is a broken sectional view of the structure illustrated in Fig. 5, taken on the line 12—12 thereof;

Fig. 13 is a sectional view of the structure illustrated in Fig. 5, taken on line 13—13 thereof;

Fig. 14 is a sectional view of the structure illustrated in Fig. 13, taken on the line 14—14 thereof;

Fig. 15 is a sectional view of the structure illustrated in Fig. 5, taken on the line 15—15 thereof;

Fig. 16 is an enlarged broken view of the instrument panel employed in the body, illustrated in Figs. 1 and 3;

Fig. 17 is an enlarged sectional view of the structure illustrated in Fig. 16, taken on the line 17—17;

Fig. 18 is a sectional view of the structure illustrated in Fig. 17, taken on the line 18—18 thereof;

Fig. 19 is an enlarged sectional view of the structure illustrated in Fig. 16, taken on the line 19—19 thereof;

Fig. 20 is a sectional view of the structure illustrated in Fig. 19, taken on the line 20—20 thereof;

Fig. 21 is a view of structure similar to that illustrated in Fig. 5 showing a modified form of the invention; and Fig. 22 is a sectional view of the structure illustrated in Fig. 21, taken on the line 22—22 thereof.

In Figure 1, a vehicle of the coupé type is illustrated having side cowl panels 25, a rear panel 26, sill panels 27, doors 28, a fabric top 29, a hood 30, and front fenders 31. The front fenders are interconnected by an apron 32 having slots in the nature of louvres 33 therein which join to and form the interconnection of the fenders 31 at the front lower end of the body. Head lamps 34 are secured to the front inwardly sloping side panels 25 resting in sockets pressed into the panels.

In Fig. 3, a similar body is illustrated wherein the rear body portion is formed of flat side panels 35 and an end panel 36 providing a compartment covered by a fabric top 37. Referring more particularly to Figs. 4 and 5, the side panels 25 are flanged inwardly at 38 to form the inner wall of the front wheel housings. Plates 39 are secured to the walls 38 and complete the wall of the housings and the outline of the fender 31. The front end of the plate 39 is welded or otherwise secured to an apron 32 to form a brace and support therefor.

The side cowl panels 25 are interconnected by a cross brace 41 which has the end portions bent downwardly and welded or otherwise secured to the panels. The panels are preformed outwardly at 42 and inwardly at 43 as illustrated in Fig. 10 forming lamp receiving sockets which are aligned with the ends of the bracket 41 through which the studs 44 of the base 45 of the lamps extend and are secured by means of nuts 46. The ball and socket connection thus provided for the lights permits their adjustment so that their rays may be positioned relative to the road. The brace 41 receives the latch 47 which is supported to the hood 30 to lock the hood in position.

The hood 30, which constitutes a cover for the space between the side cowl panels 25, is frontwardly tapered in transverse section having a front downwardly extending portion 49 which forms a continuation of the front ends of the side panels and of the apron 32. The front central portion of the hood is provided with a bracket 51 which is bolted or otherwise secured thereto. The bracket forms a pivot for the stud 52 on the upper end of which a medallion 53 is mounted. The latch 47 is welded or otherwise secured against rotation on the stud 52, being mounted between a collar 53 and a spring 54. By operating the medallion 53, the stud 52 is turned to turn the latch 47 out of or into engagement with the bracket 41.

The rear end of the hood slopes downwardly at 55 and is flanged at 56, the flange 56 being welded or otherwise secured to one leaf of a piano hinge 57, the other end being secured to the windshield frame and ledge, as will be explained more fully hereinafter. The side cowl panels are interconnected at their rear ends by a dash panel 58 having lateral flanges 59 which are welded or otherwise secured directly to the sides of the panels.

The dash panel is a unit element which is extended at 61 to form the instrument panel. The central lower portion of the dash panel has an opening 60 therein to which Z-shaped side plates 62 are welded to form an outward extension which mates with the tunnel 63 provided in the floor 64 of the body. The extension in the dash panel and the tunnel in the floor panel provides clearance for the transmission and propeller housing of the automobile. A plate 65 is removably secured to the Z-shaped plates 62 by a plurality of screws 66.

Angle-shaped reinforcing pillar elements 67 are joined to the flanges 68 of the side cowl panels 25 and welded or otherwise secured thereto. The upper ends of reinforcing bars 69 are welded to the pillar elements 67 and at their lower ends to the dash panel and side cowl panels as illustrated in Fig. 5. The ends of the bars 69, extending above the cowl panels 25, form spaced projecting ends. A windshield frame 71 has extending legs 72 bolted to the pillar elements 67 and the projecting ends of the bars 69, as illustrated in Figs. 13 and 14, by bolts 73.

The instrument panel 61 is flanged outwardly at 74 forming a ledge for receiving the lower cross bar 76 of the windshield frame 71 as illustrated in Fig. 19. A rubber sealing element 75 is disposed between the ledge 74 and the lower cross element 76 of the frame 71 by a plurality of screws 77, as illustrated in Figs. 19 and 20. The screws also secure the piano-like hinge 57 to the flange 74 and windshield cross elements 76. Slots 78 may be provided in one leaf of the hinge 57 to permit the adjustment of the hood relative to the cowl sides. A sealing element of rubber or similar material 79 may be disposed along the leg portion 72 of the windshield frame 71 for sealing the lateral rear edge 81 of the hood 30, as illustrated in Figs. 9 and 13.

It will be noted that a portion of the side cowl panels 25 is flared inwardly at 38 to form the wheel housing which mates with the chassis frame 82, as illustrated in Fig. 6. In view of the narrow tread of the rear wheels, the chassis frame is narrow at its rear end portion and the wheel housing 38 is flared inwardly toward the rear, as illustrated in Fig. 9 so that its lower edge follows the contour of the chassis frame.

The front fenders 31 are bolted to the upper laterally extending portion of the wheel housing walls 38 in the conventional manner, an antisqueak strip 83 being disposed between the fenders and the cowl side panels. The fenders 31, as illustrated in Fig. 7, mate with the side cowl panels 25 at their forward end, the panels being flanged at 84 to provide a ledge to which the fenders are bolted in the conventional manner. The fenders rest on a flange 85 of the wheel housing plate 39 and may be bolted thereto. The front ends of the fenders are flanged at 86, which flanges mate with the flanges 87 on the apron 32 to which they are bolted.

Referring to Figs. 11 and 12, an outwardly presented channel element 88 has laterally projecting flanges 89 which are welded directly to the inner surface of the side cowl panels 25, the door sill finish panels 27, and the rear panel 26 forming a box section reinforcing sill structure therewith. The floor stamping 64 at its side edges is flanged downwardly at 91 which flanges mate with and are welded or otherwise secured to the outer surface of the web of the channel element 88. The channel element is flanged at its front ends at 92 which flanges are welded to the dash panel 58. Similarly, the pillar elements 67 have their ends flanged at 93 and welded to the upper flange of the channel element 88, as illustrated in Fig. 12. Strength is provided to the floor stamping 64 by certain portions thereof which are embossed at 94 in the conventional manner.

The dash panel 58 is flanged outwardly at 95 at its lower side edges and welded to the front edge of the side cowl panel 25 from which the wheel housing inner wall 38 has been severed, the severed rear ends being flanged at 96 and welded to the front surface of the dash panel, as illustrated in Figs. 9 and 12. The upper edge of the side cowl panels 25 are flanged inwardly at 97 and then formed upwardly at 98 to provide a ledge for receiving the marginal edge of the hood 30. The pillar elements 67 have one flange extended through a slot in the flange 97 which forms a ledge upon which the end of the legs 72 of the windshield frame 71 rests. The flange 99 of the pillar elements 67 has pressed out tabs 101 against which the inner surface of the legs are drawn by the bolts 73.

In Fig. 16, the instrument panel portion 61 of the dash panel 58 is illustrated, having pressed out portions 102 and 103 in which the instruments, glove box, and other portions of the dash may be mounted. The instrument panel is provided with an angle bracing element 104 which is welded thereto and to the dash to form a rigid support for a casting 105 utilized for securing the steering wheel shaft housing 106 in rigid position. Bolts 107 extend through the plate and instrument panel and are threaded into the base of the casting 105.

Figs. 21 and 22 illustrate a modified form of the invention, wherein a separate stamping 108 is employed for the inner wall of the wheel housing. Additional stampings 109 interconnect the top of the stampings 108 with the side cowl panels 25 and form a support to which the marginal edges of the fenders 31 are bolted. The stamping 108 is flanged inwardly at 111 to rest on the chassis frame 82 of the body. Similarly, the dash panel 112 is a separate stamping joined to a top cowl panel portion 113, at 114, which forms a support for the piano hinge. An instrument panel 116 joins with the cowl panel 115, at 117, forming a ledge for the windshield. An additional stamping 118 is joined to the instrument panel 116 and to the upwardly extending portion of the dash panel 112 forming a box section structure therewith. The stamping 118 also forms a support for a stamping 119 for engaging and positioning the steering wheel shaft housing. A brace 121 is illustrated as being employed at the rear end of the hood 30 to brace the rear edge adjacent to the hinge 115.

The lower front edge 49 of the hood supports a latching bar 122 which is provided with a latch 123 which snaps over and engages a securing element 121 of inverted U-shape. The latch 123 is made of spring material so that an outward pull on the projection 125 of the bar will release the latch from the securing elements 124 when moved about the supporting pivot 126. It will be noted in Fig. 22 that the hood 30 is flanged inwardly at its marginal edge at 127 to provide strength and a ledge which rests upon the flange 97 on the side cowl panel 25. The inner flange 98 on the panel prevents water from flowing inwardly of the hood and side cowl panels.

The floor construction and rear stamping which are mated therewith are described in detail in our copending application, Serial No. 222,413, filed August 1, 1938 and assigned to the assignee of the present invention. The present application stresses more particularly the front end, cowl, dash, and instrument panel construction, while the above mentioned application stresses the rear and bottom portion of the body. The door element illustrated has been covered in the co-pending application, of Noble C. Clark, et al., Serial No. 219,564, filed July 16, 1938, and assigned to the assignee of the present invention, and reference may be had to such applications to obtain the detailed construction of such parts.

While but two embodiments of the invention have been described and illustrated, it will be apparent to those skilled in the art that various changes, omissions, additions, and substitutions may be made therein without departing from the spirit and scope of the invention as set forth in the accompanying claims.

What is claimed is:

1. A vehicle body including, in combination, a pair of cowl side panels flanged inwardly and downwardly forming the entire inner wall of the front wheel housings, pillar reinforcing elements welded to the rear edge of the cowl side panels and extended thereabove.

2. A vehicle body including, in combination, a pair of cowl side panels flanged inwardly and downwardly forming the entire inner wall of the front wheel housings, pillar reinforcing elements welded to the rear edge of the cowl side panels and extended thereabove, and an instrument panel extending between the projecting ends of the reinforcing elements and secured thereto.

3. A vehicle body including, in combination, a pair of cowl side panels flanged inwardly and downwardly forming the entire inner wall of the front wheel housings, pillar reinforcing elements welded to the rear edge of the cowl side panels and extended thereabove, and an instrument panel extending between the projecting ends of the reinforcing elements and secured thereto, the top edge of said instrument panel being flanged outwardly to form the ledge for the windshield.

4. In an automobile body, cowl side panels extending from the front door jambs to the front end of the body, lamp housings embossed on the side of said panels, lamps, and a brace extending across the panels near their front ends having downwardly projecting legs cooperating with said embossments forming a reinforcing support for the head lamps.

5. In an automobile body, cowl side panels extending from the front door jambs to the front end of the body, pillar reinforcing elements secured to said panels and extending thereabove, a windshield, and a frame for said windshield having downwardly extending legs secured to said elements.

6. The combination with a pair of side cowl panels, a dash panel joined thereto and projecting thereabove, the upper end of said panel forming the ledge for a windshield, a hood resting on said panels, and pivot means securing said hood to the ledge of said dash panel.

7. The combination with a pair of side cowl panels, a dash panel joined thereto and projecting thereabove, the upper end of said panel forming the ledge for a windshield, a hood resting on said panels, pivot means securing said hood to the ledge of said dash panel, and braces extending from said dash panel to the sides of said cowl panels inwardly of the edges thereof.

8. The combination with a pair of side cowl panels, a dash panel joined thereto and projecting thereabove, the upper end of said panel forming the ledge for a windshield, a hood resting on said panels, pivot means securing said hood to the ledge of said dash panel, a brace interconnecting the front end of said cowl panels, a hood spanning said panels, and a latch on said hood engageable with said brace for securing said hood in position.

9. The combination in an automobile body, a pair of spaced side cowl panels having a wheel housing in the lower portions thereof, said wheel housings extending from said dash panel forwardly to the front terminal end of the body, a dash panel interconnecting the rear portion of said cowl panels, an apron interconnecting the wheel housings at the front end, and fenders removably secured to the side panels and to said apron.

10. The combination in a vehicle body, a pair of spaced side cowl panels, a dash panel interconnected therebetween, said dash panel having an instrument panel formed in the upper end thereof which projects above said side panels, and reinforcing pillar elements joined to the rear edge of said side cowl panels and to the lateral edge of said instrument panel portion of the dash panel above said cowl panels.

11. The combination in a vehicle body, cowl panels, reinforcing pillar elements of angle shape to which the rear edge of the cowl panels are secured below the projecting ends of said elements, an instrument panel extending across the projecting ends of said reinforcing element, a windshield frame having extending legs resting in said projecting ends and bolted or otherwise secured thereto.

12. The combination in a vehicle body, of spaced cowl side panels, reinforcing pillar elements of angle shape secured thereto and projecting thereabove, an instrument panel having the lateral edges secured to said reinforcing elements, the upper edge of said instrument panel forming the windshield ledge, and a windshield frame having downwardly projecting legs resting in the projecting ends of said reinforcing elements and secured thereto.

13. The combination in a vehicle body, of spaced cowl side panels, reinforcing pillar elements of angle shape secured thereto and projecting thereabove, an instrument panel having the lateral edges secured to said reinforcing elements, the upper edge of said instrument panel forming the windshield ledge, a windshield frame having downwardly projecting legs resting in the projecting ends of said reinforcing elements and secured thereto, a hood spanning said side cowl panels, and a hinge connecting said hood to the windshield ledge portion of said instrument panel.

14. In an automobile body, cowl side panels, a hood enclosing said panels, pivotal means supporting the hood near the rear end thereof, a brace interconnecting the cowl panels near the front end, a latch on said hood engageable with said braces, head lamps supported on the sides of said cowl, the ends of said bracing member forming reinforcing means for said lamps.

15. The combination with a pair of side cowl panels, a dash panel joined thereto and projected forwardly and upwardly to form an instrument panel, the top edge of said instrument panel portion being flanged outwardly to form the ledge for a windshield, a bracket extending from said instrument panel, and a steering wheel engaged by said bracket to provide support therefor.

16. In a vehicle body, a front cowl section extending to the door opening, a windshield, a frame for said windshield having projecting legs supported in continuation of said cowl to form a continuation of said door opening, and a rear body portion extending forwardly to the rear marginal edge of the door opening and projecting forwardly to engage said windshield frame to complete the marginal edge of said door opening.

17. In a vehicle body, side cowl panels in spaced relation, a hood spanning said cowl sides and projecting downwardly to span the space between the front edges thereof, hinged means permitting raising and lowering of said hood relative to said cowl sides, an apron below the downwardly projecting portion of said hood, and fenders on the cowl side secured to said apron to form a closure for the front lower portion of the body.

18. In a vehicle body, side cowl panels in spaced relation, a hood spanning said cowl sides and projecting downwardly to span the space between the front edges thereof, hinged means permitting raising and lowering of said hood relative to said cowl sides, an apron below the downwardly projecting portion of said hood, fenders on the cowl side secured to said apron to form a closure for the front lower portion of the body, an instrument panel in said body having the upper end thereof flanged outwardly forming a windshield ledge, and a windshield having a frame thereabout with legs projecting downwardly therefrom resting on said ledge with legs secured to the sides of said cowl panels.

CLARENCE W. AVERY.
CHARLES H. WIDMAN.
NOBLE C. CLARK.